United States Patent [19]

Saruwatari et al.

[11] 4,101,218

[45] Jul. 18, 1978

[54] ELECTRONIC COPYING APPARATUS

[75] Inventors: Ryoji Saruwatari, Niiza; Fumio Tamakawa, Yokohama; Takeo Ikeda, Yokohama; Norio Misawa, Yokohama, all of Japan

[73] Assignee: Tokyo Shibaura Electric Co., Ltd., Kawasaki, Japan

[21] Appl. No.: 780,645

[22] Filed: Mar. 23, 1977

[30] Foreign Application Priority Data

Mar. 26, 1976 [JP] Japan .................................. 51-33203

[51] Int. Cl.[2] ....................... G03G 15/00; G03B 27/34

[52] U.S. Cl. .......................................... 355/57; 355/11

[58] Field of Search .................................... 355/47-51, 355/60, 66, 57, 8, 11

[56] References Cited

U.S. PATENT DOCUMENTS

| | | | |
|---|---|---|---|
| 3,637,303 | 1/1972 | Komori et al. | 355/66 X |
| 3,792,926 | 2/1974 | Knechtel et al. | 355/11 X |
| 3,837,743 | 9/1974 | Amemiya | 355/57 X |
| 3,841,753 | 10/1974 | Ogawa | 355/66 X |
| 4,027,963 | 6/1977 | Hoppner et al. | 355/66 X |

FOREIGN PATENT DOCUMENTS

| | | | |
|---|---|---|---|
| 401,442 | 2/1970 | Australia | 355/8 |

*Primary Examiner*—Donald A. Griffin
*Attorney, Agent, or Firm*—Cushman, Darby & Cushman

[57] ABSTRACT

An electronic copying apparatus comprises a movable optical unit with a mirror lens defining a first light path between an original and the mirror lens and a second light path between the mirror lens and a photosensitive body, which include a ratio of optical distances controlled according to the copying magnification, and driving belts to move the photosensitive body according to the correlation as follows $$V_P = |V_L(1-\alpha)|$$

where $V_P$ is a moving speed of the photosensitive body, $V_L$ is a moving speed of the optical unit and $\alpha$ is a copying magnification.

8 Claims, 6 Drawing Figures

ELECTRONIC COPYING APPARATUS

BACKGROUND OF THE INVENTION

This invention relates to a copying apparatus with convertible copying magnification, more specifically to an electronic copying apparatus with a scanning optical unit.

In an electronic copying apparatus, it is desirable to secure copying with convertible magnification, i.e., with reduced or enlarged original surface as well as copying with full-scale original surface (hereinafter referred to as full-scale copying or 1 : 1 copying), while a variety of systems for conversion of magnification have conventionally been developed and put to practical use. For example, some systems have various lenses for convertion with each magnification, while others may secure exposure by changing the location of lenses and moving incident-side mirrors at different speeds, though all these systems have complicated configurations and may produce blurred pictures due to vibration of moving parts. A typical example of these systems is as illustrated in U.S. Pat. No. 3,837,743. This is so designed that spare mirrors, previously contained in the optical unit, are used to change the optical distance in conversion of magnification and the original or supporting table is moved with a movement of the optical unit in prescribed relation therewith. The copying apparatus of this U.S. patent is disadvantageous in that the driving system is complicated and large-sized because the relatively heavy supporting table requires to be moved at a speed according to the copying magnification, that it is difficult to synchronize the respective moving members to each other and that such movement of the supporting table is accompanied by vibration of the whole apparatus to cause blurred pictures, thereby preventing production of distinct copies.

SUMMARY OF THE INVENTION

Accordingly, an object of this invention is to provide an electronic copying apparatus in which a system for convertion of copying magnification is not complicated and there is no such objection as to blur copied pictures including vibration of the whole apparatus and the like.

DETAILED DESCRIPTION OF THE PREFERRED EMBODIMENT

Now I will describe the electronic copying apparatus according to an embodiment of this invention with reference to the attached drawings.

Figure 1:
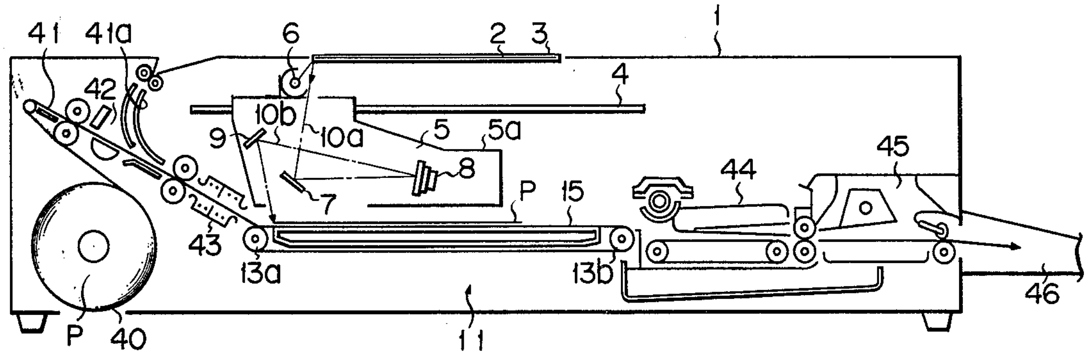
FIG. 1 is a schematic view illustrative of the whole of the electronic copying apparatus according to an embodiment of the invention.
Figure 2:
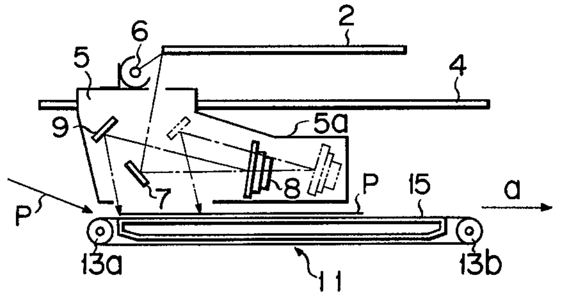
FIG. 2 is a schematic view illustrative of the optical unit of the apparatus of FIG. 1.
Figure 3:
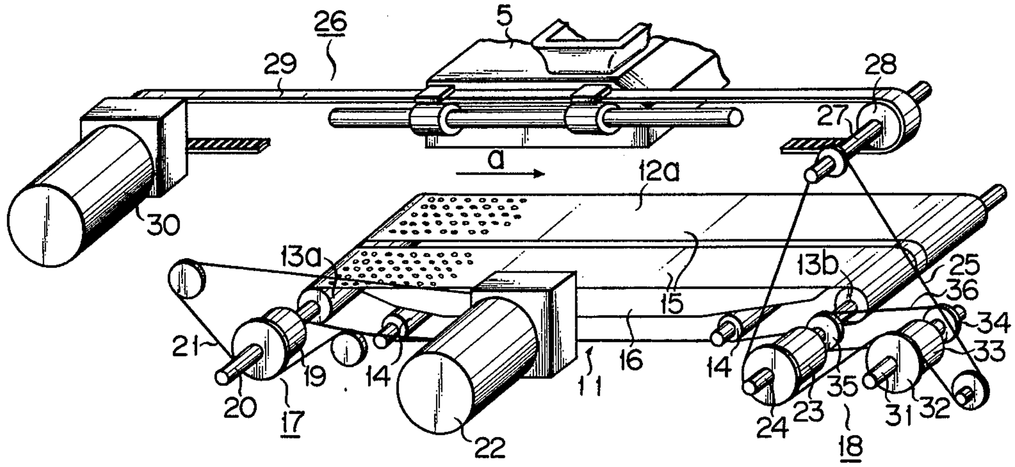
FIG. 3 is a perspective view illustrative of the optical unit, photosensitive body conveying system, and driving mechanisms for them.

Referring now to FIG. 1, numeral 1 indicates a body of electronic copying apparatus, and on the top surface thereof is fixed an original mount 3 for stationarily carrying an original 2. Below the original mount 3 is provided an optical unit 5 supported by a guide rail 4 and reciprocated in the longitudinal direction of the body 1 in parallel with the original mount 3 by a driving means as mentioned hereinafter. The optical unit 5 has a black box or housing 5*a* and a linear light source 6 attached to the box 5*a* for irradiating the surface of the original. The black box 5*a* contains a first mirror 7 for receiving the reflected light from the original surface, a mirror lens 8 for converging and reflecting the reflected light from the mirror 7, and a second mirror 9 for rendering the light from the lens 8 upon a photosensitive body as mentioned hereinafter. This optical system defines a first reflected-light path 10*a* from the original surface to the mirror lens 8 through the first mirror 7 and a second reflected-light path 10*b* from the mirror lens 8 to the photosensitive body through the second mirror 9. Said mirror lens 8 and second mirror 9 may be moved horizontally by a positioning means (not shown) so that the first optical path 10*a* is equal to the second optical path 10*b* in length in full-scale copying, while the former is longer than the latter in reduced-scale copying, and the latter is longer than the former in enlarged-scale copying. For example, as shown in FIG. 2, the mirror lens 8 and the second mirror 9 are set at positions as indicated by the solid lines and the chain lines for full-scale copying and reduced-scale copying respectively. Under said optical unit 5 is located a support means 11 for the photosensitive body or paper. This support means 11 is to hold a fed photosensitive paper in a fixed exposure position, and, as shown in FIG. 3, is composed of endless conveyor belts 15 with perforations stretched over a pair of driving rollers 13*a* and 13*b* located at a fixed distance from each other and a pair of idle rollers 14, and a vacuum chamber 16 located opposite to the back of the upper level section of each of these conveyor belts 15. The top surface of the upper level section of the conveyor belt 15 defines an exposure surface 12*a* for adsorbing and holding the photosensitive paper thereon by means of the vacuum chamber 16 through the perforations of the belt 15. The conveyor belt 15 is driven by a first belt driving mechanism 17 and a second belt driving mechanism 18 at time of full-scale copying and reduced- or enlarged-scale copying respectively to carry in, carry out, and transfer the photosensitive paper. In the first belt driving mechanism 17, the shaft of one driving roller 13*a* is coupled to a driving shaft 20 through an electromagnetic clutch 19. The driving shaft 20 is operatively connected to a first driving source or motor 22 through a drive transmitting mechanism or chain driving system 21. In the second belt driving mechanism 18, the shaft of the other driving roller 13*b* is coupled to a driving shaft 24 through an electromagnetic clutch 23. The driving shaft 24 is operatively connected to a driven shaft 27 of a driving mechanism 26 for the optical unit 5 through a drive transmitting mechanism or chain driving system 25. The optical unit driving mechanism 26 has a toothed driving belt 29 for sustaining the housing 5*a* of the optical unit 5, a driving pulley (not shown) for drivably sustaining the belt 29, and a driven pulley 28. The driving pulley is attached to the shaft of a second driving source or motor 30 capable of rotating forward and reversely, while the driven pulley 28 is attached to said driving shaft 27.

Said second driving mechanism 18 further includes an element for enlarged-scale copying having a pulley 32 attached to one end of a driving shaft 31 and engaged with said chain driving system 25. To the other end of the driving shaft 31 is attached another pulley 34 through an electromagnetic clutch 33, and a chain 36 is stretched between said pulley 34 and a pulley 35 on the shaft of said roller 13*b*. In the second driving mechanism 18 with such construction, the driving force of the second electric motor 30 is transmitted to the roller 13*b* through the chain driving systems 25 and 26 so that, when the optical unit 5 is driven in a direction as indicated by an arrow *a* for exposure, one electromagnetic clutch 23 is turned "ON" and the other electromagnetic clutch 33 is turned "OFF" to shift the belt 15 in the direction of the arrow *a* for reduced-scale copying, while, for enlarged-scale copying, the former 23 is turned "OFF" and the latter 33 is turned "0N" to shift the belt 15 in the opposite direction to the arrow *a*.

Referring to FIG. 1, at one side within said body 1 is located a paper feed section 40 for feeding rolled photosensitive paper P. The photosensitive paper P supplied from the paper feed section 40 is fed to said support mechanism 11 by and along a conventional conveyor mechanism 41 composed of conveyor pinch rollers, a conveyor belt, and a guide plate. The conveyor mechanism 41 is provided with a cutter 42 for cutting the photosensitive paper P passing therethrough into a prescribed size. On the discharge side of the conveyor mechanism 41 is located a charging means 43 for charging the photosensitive surface of the photosensitive paper P with electricity, where the charged photosensitive paper P is fed to said support mechanism 11. A branch conveyor mechanism 41*a* for manually fed photosensitive paper is additionaly provided to the inlet section of said main conveyor mechanism 41. Further, on the discharge side of the support mechanism 11 is provided a developing device 44 for developing the exposed surface of the photosensitive paper P and a heat-fixing device 45 for fixing the developed portion. On the other side of said body 1 is provided a tray 46 for receiving copied papers processed by the fixing device 45.

Figure 4:
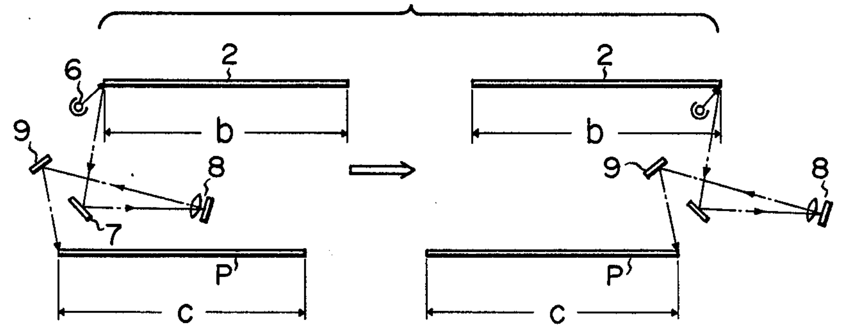
FIG. 4 is a schematic view illustrative of the relation between the original, optical unit, and photosensitive body at time of full-scale copying.
Figure 5:
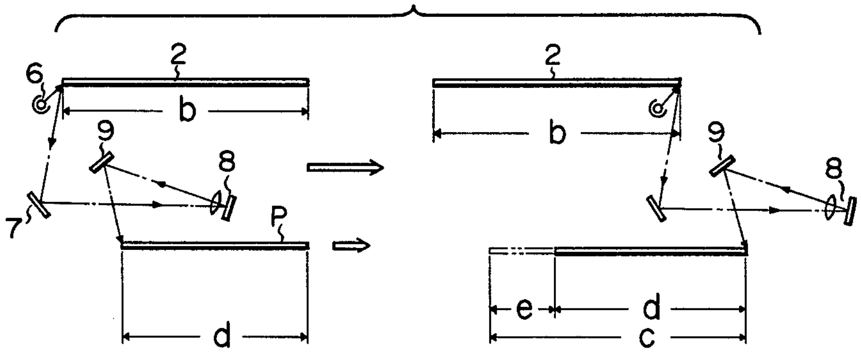
FIG. 5 is a schematic view similar to FIG. 4 at time of reduced-scale copying.
Figure 6:
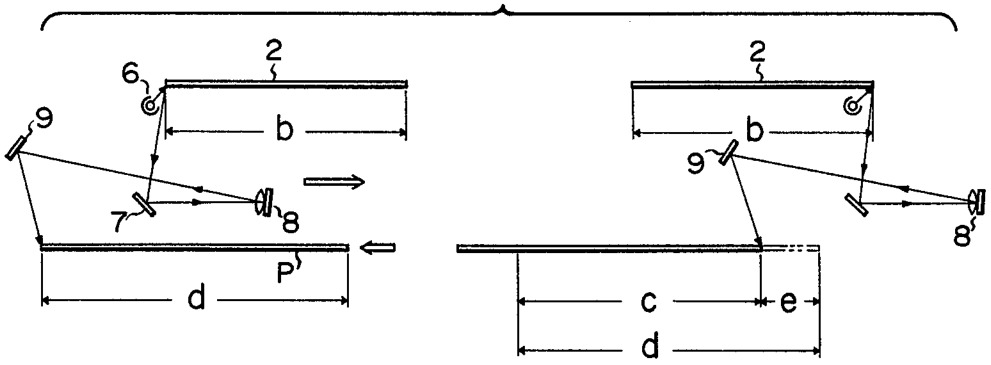
FIG. 6 is a schematic view similar to FIG. 4 at time of enlarged-scale copying.

Now I will describe the copying apparatus with the aforementioned construction with reference to FIGS. 4 to 6.

First, referring to FIG. 4, there will be mentioned the case of full-scale copying.

The original 2 is placed on the original mount 3 to be irradiated, the photosensitive paper P is delivered from the paper feed mechanism 40 by pressing down a copying button (not shown) in the same manner as in the conventional copying machines, said paper P is cut into the same size as the original by the cutter 42, and then the photosensitive surface is charged with electricity by the charging device 43. The charged photosensitive paper P is led to the support mechanism 11, transferred forward on and by the belt 15 of said mechanism 11 to push and close a microswitch (not shown) through the leading edge of the paper, thereby stopping the drive of the belt 15, and then stopped and held in a prescribed position on the belt. By such closing of the microswitch, the light source or lamp 6 gets to irradiate, a reflected light from said lamp 6 is led to the photosensitive surface of the paper P, and the optical unit 5 is shifted in the direction of the arrow *a* in FIG. 2, thereby allowing the light source to slit-scan the original surface. Consequently, in the same manner as in the conventional copying machines, an electrostatic latent image of the original surface is formed on the photosensitive paper P in a full scale. In the full-scale copying, as shown in FIG. 4, the length b of the original surface and the length c of the photosensitive surface are equal to each other, and the first and second reflected-light paths 10*a* and 10*b* are equal to each other in length, while the photosensitive paper is subjected to a full-exposure process in a stationary condition. After completion of the exposure process, the lamp 6 is put out and the optical unit 5 is restored in situ. At the same time, the belt 15 of the support mechanism 11 is driven again, and the photosensitive paper P is led to the developing device 44, where the photosensitive paper P is developed by the toner contained in the developing device 44 according to the charged pattern, thereby accomplishing developing process. Then, the developed photosensitive paper P is led to the heat-fixing device 45 for fixation of toner image, and discharged to the tray 46.

In case of reduced-scale copying, the original 2 is placed on the original mount 3, and then a reducing button (not shown) is pressed down. As a result, the positioning mechanism of the optical unit 5 is operated to shift the mirror lens 8 and the second mirror 9 in a parallel way to the positions indicated by the two-dottes chain lines in FIG. 1, and the first reflected-light path 10*a* is rendered longer than the second reflected-light path 10*b* by a prescribed degree. Thereafter, the reduced-scale copying button is pressed down, and, in the same manner as in full-scale copying, the photosensitive paper P is held on the support mechanism 11. In this case, the photosenstive paper P is cut by the cutter 42 to a size corresponding to the reducing magnification in the middle of the shifting. When the optical unit 5 starts to scan, the support mechanism 11 is driven at a speed corresponding to the moving speed of the optical unit 5 thereby so as to shift the photosensitive paper P in the same direction as said unit 5. The relation between the photosensitive paper 2 subject to exposure and the copying paper P is as shown in FIG. 5. The moving speed $V_P$ of the supporting belt 15 and thus the photosensitive paper P at this time may be obtained from the following equation.

$$V_P = V_L(1 - \alpha)$$

Here $V_L$ is a moving speed of the optical unit, and $\alpha$ is a copying magnification (e.g., at about 0.707 in taking an A4-sized copy from an A3-sized original). According to the above equation, while the optical unit 5 moves through the length *b* of the original surface at a speed of $V_L$, the photosensitive paper P with the photosensitive surface length of *d* shifts through a distance of *e* in the same direction at a speed of $V_P$. That is, the sum of *d* and *e* or *c* is as long as the length *b* of the original surface, so that a reduced-scale copied image is formed as an electrostatic latent image on the photosensitive surface. Thereafter, in the same manner as in said full-scale copying, the paper is subjected to the developing and fixing processes, and then discharged into the tray 46.

In case of enlarged-scale copying, an enlarging button (not shown) is pressed down to shift the mirror lens 8 and the second mirror 9 of the optical unit 5 in a parallel way oppositely to the direction as indicated in FIG. 2 so that the first reflected-light path 10*a* is rendered shorter than the second reflected-light path 10*b* by a prescribed degree. Thereafter, the enlarged-scale copying button is pressed down, and, in the same manner as in full-scale copying, the photosensitive paper P is held on the support mechanism 11. In this case, the photosensitive paper P is cut by the cutter 42 to a size corresponding to the enlarging magnification in the middle of the shifting. When the optical unit 5 starts to scan, the support mechanism 11 is driven at a speed corresponding to the moving speed of the optical unit 5 thereby so as to shift the photosensitive paper P in the opposite direction to the moving direction of said unit 5. The relation between the original 2 subject to exposure and the copying paper P is as shown in FIG. 6. The moving speed $V_P$ of the supporting belt 15 or the photosensitive paper P at this time may be given as follows:

$$V_P = -\{V_L(1-\alpha)\}.$$

According to this equation, while the optical unit 5 moves through the length *b* of the original surface at a speed of $V_L$, the photosensitive paper P with the photosensitive surface length of *d* shifts through a distance of *e* in the opposite direction at a speed of $V_P$. That is, the difference between *d* and *e* or *c* is as long as the length *b* of the original surface, so that an enlarged-scale copied image is obtained.

In the copying apparatus as described hereinbefore according to an embodiment of this invention, an optical shift control means well-known in the art may be used as an operative connecting means between the full-scall, reduced-scale, and enlarged-scale copying buttons and the positioning means for shifting the mirror lens 8 and the second mirror 9 of the optical unit suitably to the desired positions. Likewise, the operative connecting means between the full-scale, reduced-scale, and enlarged-scale copying buttons and the optical unit may be of a type which may be readily effected by one skilled in the art.

As for means for changing the ratio of length of the first reflected-light path to the second reflected-light path of the optical unit, there may be employed e.g. a method in which the optical path length is changed by making an additionally provided mirror act on the optical path as well as one in which the mirror lens and the second mirror are shifted correspondingly to the first mirror.

In the apparatus of this invention, change of magnification may be easily made by fixing the original, changing the ratio of length of the first to second reflected-light paths as needed, and shifting the photosensitive body and the optical unit in a correlation according to the following equation.

$$V_P = |V_L(1-\alpha)|$$

Here $V_P$ is a moving speed of the photosensitive body, $V_L$ is a moving speed of the optical unit, and $\alpha$ is a copying magnification.

What is claimed is:

1. An electronic copying apparatus comprising a copying machine body; original mount means for fixing an original to said body; support means for supporting a photosensitive body in parallel with said original; an optical unit provided in said machine body to move along said original and including a light source for irradiating said original and lens means defining a first light path between the original and the lens means and a second light path between the lens means and the photosensitive body, both said first and second light paths having a ratio of optical distances controlled according to the copying magnification; and driving means for stopping the photosensitive body to allow the optical unit to perform scanning in full-scale copying and in varied-scale copying, allowing the optical unit to perform scanning while moving the photosensitive body and the optical unit according to the correlation as follows $$V_P = |V_L(1-\alpha)|$$

where $V_P$ is a moving speed of the photosensitive body at time of exposure, $V_L$ is a moving speed of the optical unit at time of exposure, $V_L$ is a moving speed of optical unit at time of exposure, and $\alpha$ is a copying magnification.

2. An electronic copying apparatus comprising a copying machine body; original mount means for fixing an original to said body; support means for supporting a photosensitive body in parallel with said original; an optical unit provided in said machine body to move along said original and including a light source for irradiating said original, a first reflecting member for receiving a reflected light from said original, a lens for receving a reflected light from said first reflecting member, and a second reflecting member for receiving a reflected light from said lens and irradiating said photosensitive body, said optical unit defining a first reflected-light path from said original to the lens through the first reflecting member and a second reflected-light path from the lens to the photosensitive body through the second reflecting member, both said reflected-light paths having a ratio of optical distances controlled according to the copying magnification; and driving means for stopping the photosensitive body to allow the optical unit to perform scanning in full-scale copying and in varied-scale copying, allowing the optical unit to perform scanning while moving the photosensitive body and the optical unit according to the correlation as follows:

$$V_P = |V_L(1-\alpha)|$$

where $V_P$ is a moving speed of the photosensitive body at time of exposure, $V_L$ is a moving speed of the optical unit at time of exposure, and $\alpha$ is a copying magnification.

3. An electronic copying apparatus as in claim 2, wherein said driving means performs reduced-scale copying by moving the photosensitive body and the optical unit in accordance with a correlation;

$$V_P = V_L(1-\alpha).$$

4. An electronic copying apparatus as in claim 3, wherein said lens and second reflecting member of said optical unit have a ratio of optical distance between the first and second reflected-light paths varied with a movement along the photosensitive body in parallel therewith.

5. An electronic copying apparatus as in claim 2, wherein said driving means performs enlarged-scale copying by moving the photosensitive body and the optical unit in accordance with a correlation;

$$V_P = -\{V_L(1-\alpha)\}.$$

6. An electronic copying apparatus as in claim 2, wherein said optical unit has drive transmitting means for driving said support means to move the photosensitive body accompanying a movement thereof.

7. An electronic copying apparatus as in claim 6, wherein said support means has endless belts for supporting the photosensitive body on the top surface thereof and rollers for moving said endless belts by forward and reverse rotation through said drive transmitting means.

8. An electronic copying apparatus as in claim 2, wherein said lens is a mirror lens.

* * * * *